Patented Mar. 9, 1948

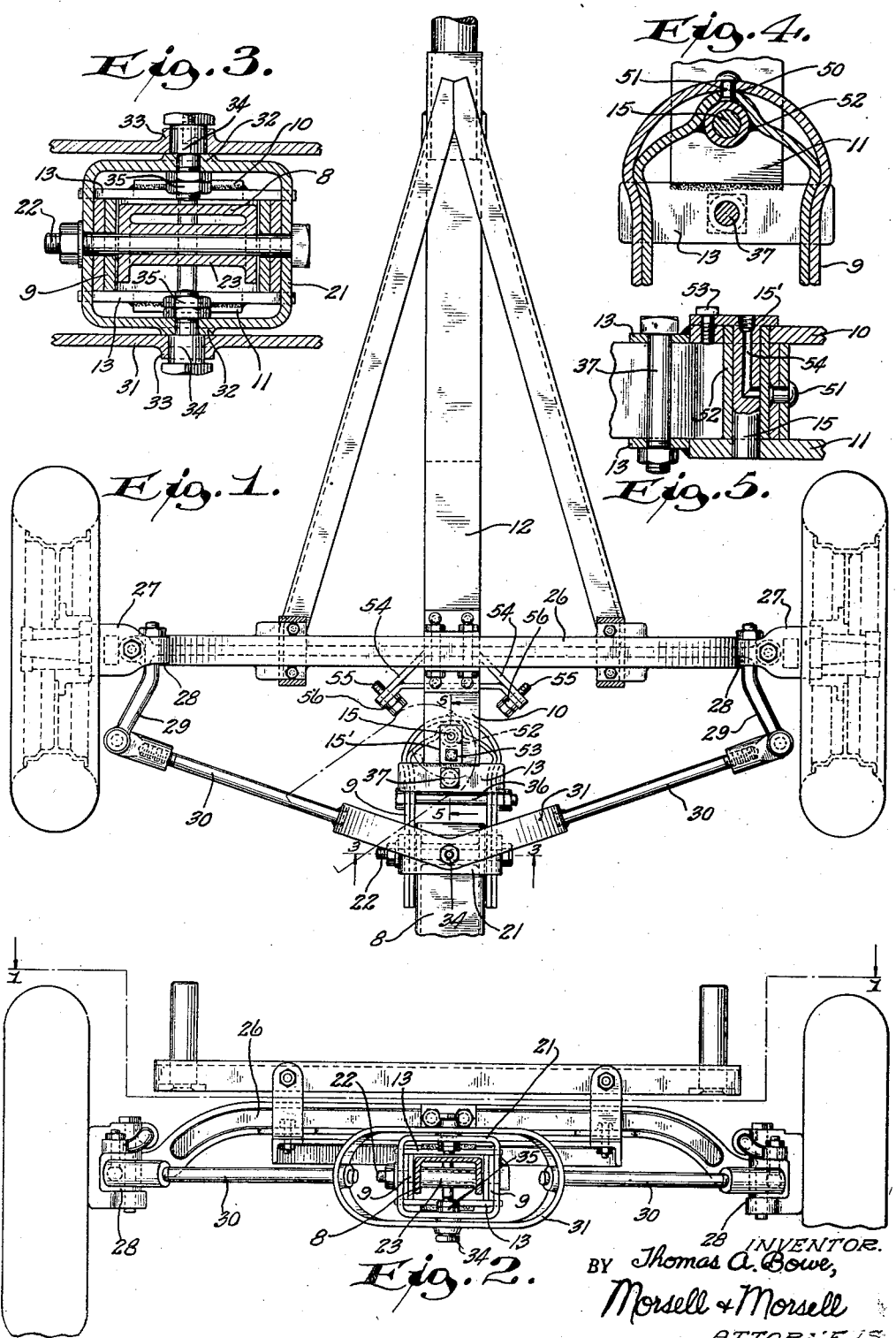

2,437,590

UNITED STATES PATENT OFFICE 2,437,590

STEERING GEAR FOR WHEELED VEHICLES

Thomas A. Bowe, Hilbert, Wis.

Application November 23, 1945, Serial No. 630,418

2 Claims. (Cl. 280—33.55)

This invention relates to improvements in steering gears for wheeled vehicles, and is particularly applicable to wheeled agricultural implements, trailers, and other types of vehicles having steerably mounted front wheels angularly turned by a forwardly extending steering pole and connection, which pole and connection is hitched to a tractor or other propelled towing vehicle.

A general object of the invention is to provide a farm implement, trailer, or wagon steering gear which is more simple, rigid and durable than the present types of steering gears for said implements and vehicles and which will eliminate whipping as between the towed and towing vehicles, minimizing side sway of the towed vehicle.

A further object of the invention is to provide, in a wheeled vehicle steering gear, massive members connected together and adapted for relative movement, but susceptible of easy movement and arranged to prevent looseness, play and wear as between the relatively movable parts.

A further object of the invention is to provide a wheeled vehicle steering gear in which the inner ends of the steering rods are adjustably carried by a one piece yoke member which is centrally pivotally mounted relative to the vehicle steering pole in a very rigid and compact manner which eliminates the necessity for independent bushings.

A further object of the invention is to provide, in a wheeled vehicle steering gear, spaced horizontal plates which turnably embrace therebetween top and bottom edge portions of the turnable connecting clevis, thereby supporting said clevis against undesired tilting or rocking movement during operations.

A further object of the invention is to provide, in a wheeled vehicle steering gear, improved adjustable means for limiting the turning movement of the steering gear.

A further object of the invention is to provide, in a wheeled vehicle steering gear of the character described, a double thickness clevis member which embraces a vertical pivot bolt and provides a relatively great bearing surface.

Still another specific object of the invention is to provide, in a wheeled vehicle steering gear including a pivotal steering pole, improved means for anchoring the bolt upon which the pole is mounted for movements in a vertical plane, the anchorage for said bolt being such as to prevent wear and strain on the surfaces of the contacting elements.

A further object of the invention is to provide, in a wheeled vehicle steering gear, an improved pivotal connection between the adjacent inner end portions of the vehicle steering pole and reach, said pivotal connection including a double thickness clevis with means engaging the latter to prevent it from spreading and tilting when strains are imposed on it during movements of the steering pole.

A further object of the invention is to provide a steering gear for wheeled trailer vehicles, which is of very simple construction, is strong, durable and rigid, which is inexpensive to manufacture, which is efficient in operation, and which is well adapted for the purposes described.

With the above and other objects in view, the invention consists of the improved steering gear for wheeled vehicles, and its parts and combinations as set forth in the claims, and all equivalents thereof.

In the accompanying drawing in which the same reference characters indicate the same parts in all of the views:

Fig. 1 is a fragmentary plan view, with portions in section, of the improved steering gear as applied to the front axle and forward end portion of a wheeled vehicle or implement of the trailer type, said view being indicated by the line 1—1 in Fig. 2;

Fig. 2 is a front view of the trailer vehicle's chassis, front axle and steering gear, with the steering pole in cross section;

Fig. 3 is an enlarged detail sectional view taken on line 3—3 of Fig. 1;

Fig. 4 is an enlarged fragmentary horizontal sectional view through the clevis portion of the steering gear; and Fig. 5 is an enlarged detail sectional view taken on line 5—5 of Fig. 1.

It should be understood that the improved steering gear is applied to the front end structure of a trailer vehicle and is directly associated with said vehicle's wheel-carrying front axle. Said vehicle includes a reach and a forwardly extending steering pole, the latter being adapted to be hitched to the rear end portion of a tractor or other vehicle which furnishes the motive power and which does the towing. The trailer vehicle or implement to which the improved steering gear is applied has not been completely illustrated as the drawing discloses only the front end portions of the elements with which the steering gear is directly associated. The vehicle to which the invention is applied is preferably a wheeled farm implement, wagon, or other form of trailer vehicle.

Referring now more particularly to the drawing, it will appear that the steering pole of a wheeled trailer vehicle is indicated by the numeral 8. Said steering pole extends forwardly and its outer end is adapted to be hitched to the rear end portion of a tractor, a self-propelled towing vehicle such as a truck, or an animal pulled vehicle (not shown). The inner end portion of the steering pole 8 has its side portions embraced by the side arm portions of a clevis 9. This clevis differs from the yoke shown in my prior Patent No. 2,333,149, in that it is of double thickness, as clearly shown in Fig. 4, with the curved inner ends thereof being of different contour but in contact as at 50, with said contacting portions being riveted together as at 51. Within the curved inner end of the inner layer of the clevis 9, is welded or otherwise secured, a cylindrical vertically extending bearing 52 for a purpose hereinafter to be set forth. The curved closed inner end of the clevis 9 extends beyond the inner end of the steering pole 8 and is positioned between upper and lower horizontal flanges 10 and 11 at the forward end of a wagon or vehicle reach 12. Welded or otherwise secured to the ends of the horizontal flanges 10 and 11 are spaced transverse plates 13. These plates embrace therebetween upper and lower edge portions of the clevis 9 and ride along the edges of the clevis during turning movements of the steering gear and are effective in preventing angular or tilting displacement of the connected end portions of the steering pole and wagon reach. The bore of the bearing 52 is adapted to receive the shank portion of a hardened steel pin 15 which provides the main connection as between the adjacent inner end portions of the steering pole 8 and the reach 12. As is shown in Fig. 5 said pin 15 is formed with a plate-like head 15' which is anchored by means of a bolt 53 to the top of the reach flange 10, whereby the pin 15 is prevented from rotating. The pin 15 is maintained stationary so that the bearing 52, integral with the closed end portion of the steering pole carried clevis 9, turns or pivots on the stationary pin 15. Said pin, being of hardened steel, effectively takes the wear. Also the doubled formation of the clevis increases its strength and provides greater bearing surface in engagement with the transverse plates 13. It should also be noted that the pin 15 is formed with an oil duct 54 by which means the interior of the bearing 52 may be kept lubricated.

The inner end of the steering pole 8 is provided with an encircling strap 21 disposed exteriorly of the side arms of the bi-layered clevis 9. The inner end of the steering pole 8 is pivotally attached to the side arms of said clevis 9. This is accomplished by means of a horizontal bolt 22. The major portion of the shank of said bolt extends through a sleeve portion 23 (see Fig. 3) in the inner end of the pole 8.

It will be observed that the vehicle to which the improved steering gear is applied includes a rigid front axle 26, to the opposite extremities of which are pivotally attached wheel-carrying stub axles 27. The improved steering gear is adapted to effect simultaneous and uniform movement of the wheel-carrying stub axles which are equipped with the usual steering knuckles 28. The latter carry short steering arms 29 to the outer ends of which are pivotally and adjustably connected angularly directed steering rods 30. The outer end of each steering rod 30 is rigidly secured to the closed end portion of a yoke 31. Said yoke is of one piece and is V-shaped in plan view, as shown in Fig. 1, so as to aline with the angular disposition of the steering rods 30. Said yoke is sufficiently wide to embrace the band 21 and the apex of the angular yoke 31, both on the top and bottom sides thereof, is pivotally mounted on the band 21 and hence is pivotally associated with the steering pole 8 as is best shown in Fig. 3 in the drawing. In said view it will be noted that the medial upper and lower portions of the band 21 are formed with projecting boss portions 32 which are provided with bores. Likewise, the medial upper and lower portions of the yoke 31 are formed with boss portions 33 provided with bores. Shouldered pivot pins 34 are extended through the openings in the registering bosses 32 and 33, said pivot pins having headed outer extremities and having their inner extremities threaded and carrying nuts 35. The pivot pins 34 permit the jointed parts to pivot thereon in a horizontal plane and connect the yoke 31 to the band 21.

By the provision of the angular yoke 31 which carries the ends of the steering rods 30, pivotal connections are made with the steering pole both adjacent the upper and lower surfaces thereof, dividing the strains and stresses, minimizing wear, and providing additional and substantial bearing surfaces. Said yoke is preferably formed of spring steel to give resiliency and additional strength.

Intermediate side portions of the bi-layered clevis 9, beyond the extremity of the steering pole 8, are connected by a transverse horizontal bolt 36. This bolt normally functions to prevent spreading of the opposite sides of the clevis 9 when strain is imposed thereon due to horizontal movements of the steering pole 8. There is also a vertically disposed bolt 37 connecting the transverse horizontal plates 13. Said vertical bolt 37 is positioned so that it will be engaged by the side inner surface portions of the arms of the clevis 9 and thereby form a stop to limit turning movements of the steering pole 8 in either direction horizontally. At such times as the bolt 37 acts as a stop, in contacting with the sides of the clevis 9, there is an outward force imposed against that portion of the clevis which contacts with the bolt 37. During these periods the horizontal bolt 36 finds its greatest utility in restraining outward bowing of the clevis.

The present invention does not rely entirely, however, on the vertical bolt 37 to provide the pivot limiting stop mentioned. It is possible that after considerable service said bolt might become sheared, and if the bolt is made heavy enough to withstand shearing it will then restrict or hinder free turning movement of the mechanism. Therefore, to guard against this contingency and to permit the use of a bolt which is not too heavy, an additional stop mechanism is provided to limit horizontal turning movements of the steering pole 8. Said additional stop means comprises a pair of angularly directed brackets 54 rigidly secured between the flanged inner extremities of the vehicle reach 12. In the outer end of each bracket 54 is threaded a headed bolt 55, and said bolts may be turned inwardly or outwardly to regulate the points of stop contact with the turned steering pole to limit the turning movement of the latter, in either horizontal direction. Each bolt 55, furthermore, carries a lock nut 56 to secure it in adjusted position. According to the settings of the bolts 55, when the steering pole 8 turns horizontally sufficiently far it will contact the head of the adjusted bolt 55, as shown in broken lines in Fig. 1, and thereby prevent further turning movement of the steering pole in that direction.

Inasmuch as the forward end of the reach 12 is of recessed formation by virtue of the space between the flanges 10 and 11 and the transverse plates 13, if no provisions were made to guard thereagainst, during up and down pivotal movements of the steering pole 8, strains in a horizontal direction would be imposed against the horizontal flanges 10 and 11 of the reach, and the transverse plates 13, which strains would ordinarily tend to spread the mentioned parts. The vertical bolt 37 guards against this contingency.

The improved steering gear provides a massive structure which encircles the end portion of the steering pole adjacent its connection with the vehicle reach and as a result, strains and stresses are thoroughly distributed. The one-piece yoke 31, in its relationship to the assembly, adds strength and rigidity and minimizes torsional strains as well as lost motion relative to the steering arms during sidewise movements of the steering pole.

Parts of the structure which might ordinarily be subjected to bowing and deflections are suitably reinforced and braced. Due to the rigidity of the mechanism and the elimination of play and lost motion in the connections, a trailer vehicle may be towed in a very stable manner with a minimum of whipping and side-sway as between the towed and towing vehicles.

From the foregoing description it will be seen that the improved steering gear for wheeled vehicles is of simple strong and effective construction, and is well adapted for the purposes set forth.

What is claimed as the invention is:

1. A steering gear, comprising a vehicle chassis including a central reach, the forward end portion of the reach having spaced horizontal flanges, wheel-carrying axle members pivotally associated with forward portions of the chassis, a steering pole having an articulated inner end section including a strap, the articulated portions of the steering pole being relatively movable in a vertical plane, the extremity of the articulated portion of the steering pole extending between the spaced flanges of the reach, means pivotally connecting said extremity of the steering pole to said flanges of the reach for horizontal turning movements, complementary, adjustable means carried by adjacent portions of the steering pole and reach for limiting relative turning movements of the same, a pair of angularly related steering rods pivotally associated at opposite ends with said axle member, a unitary member interposed between and having its opposite ends connected to said steering rods, and pivot members mounting said unitary member on said strap.

2. A steering gear, comprising a vehicle chassis including a central reach, the forward end portion of the reach having spaced horizontal flanges, spaced transverse plates carried by the ends of said flanges, wheel-carrying axle members pivotally associated with forward portions of the chassis, a steering pole having an articulated inner end section including a clevis, the articulated portions of the steering pole being relatively movable in a vertical plane, the extremity of the clevis extending between the spaced flanges of the reach and intermediate portions of the clevis extending between said transverse plates and being prevented from rocking thereby, means pivotally connecting said extremity of the clevis to said flanges of the reach for horizontal turning movements, adjustable complementary means carried by adjacent portions of the steering pole and reach for limiting relative turning movements of the same, a pair of angularly related steering rods pivotally associated at opposite ends with said axle member, a unitary yoke member interposed between and having its opposite ends connected to said steering rods, and means intermediately pivotally associating said yoke member with the steering pole.

THOMAS A. BOWE.

REFERENCES CITED

The following references are of record in the file of this patent:

UNITED STATES PATENTS

| Number | Name | Date |
|---|---|---|
| 2,333,149 | Bowe | Nov. 2, 1943 |